United States Patent [19]

Mangone

[11] Patent Number: 4,562,127
[45] Date of Patent: Dec. 31, 1985

[54] BATTERY CAP WITH ELECTROLYTE LEVEL INDICATOR

[75] Inventor: Pascuale Mangone, Ventura, Calif.

[73] Assignee: Domingo Mangone, Buenos Aires, Argentina

[21] Appl. No.: 594,937

[22] Filed: Mar. 29, 1984

[51] Int. Cl.⁴ .............................................. H01M 2/00
[52] U.S. Cl. ........................................ 429/89; 429/91
[58] Field of Search ...................... 429/71, 72, 82, 83, 429/89, 91; 73/293, 322.5, 327; 137/558, 559

[56] References Cited

U.S. PATENT DOCUMENTS

| | | | |
|---|---|---|---|
| 2,835,720 | 5/1958 | Buskirk | 429/89 |
| 2,886,624 | 5/1959 | Krukowski | 429/91 |
| 2,888,984 | 6/1959 | Willits | 160/58 R |
| 3,079,887 | 3/1963 | Dawkins | 429/91 X |
| 3,080,753 | 3/1963 | Tickner et al. | 429/91 X |
| 3,319,597 | 5/1967 | Schnitzius et al. | 429/89 |
| 3,383,917 | 5/1968 | Ryder et al. | 429/91 X |
| 3,563,806 | 2/1971 | Hruden | 429/91 X |
| 3,915,753 | 10/1975 | Melone | 429/91 |
| 4,184,011 | 1/1980 | Strazewski | 429/91 |
| 4,308,817 | 1/1982 | Peterson | 429/91 X |

*Primary Examiner*—Anthony Skapars
*Attorney, Agent, or Firm*—Marvin E. Jacobs

[57] ABSTRACT

The indicator cap (22 or 80) is formed of a base connected to a transparent tube (46) forming a cylindrical cavity (48) receiving a colored or opaque float (70). The position of the float (70) within the tube (46) indicates the level of the electrolyte in the cell (20) of the battery (10). The float contains an upper collar (74) which cooperates with top vent (60) or side vent (92) to seal the cell. The collar (74) engages the annular disc (76) or apertured collar (86) to prevent the float (70) from falling into the cell (20) when the cap (22 or 80) is removed from the aperture (24).

13 Claims, 3 Drawing Figures

BATTERY CAP WITH ELECTROLYTE LEVEL INDICATOR

DESCRIPTION

1. Background of the Invention

This invention relates to a cap for a cell of a rechargeable battery and, more particularly, this invention relates to a cap incorporating an indicator for determining the level of electrolyte in the cell.

2. Statement of the Prior Art

The most prominent rechargeable, storage battery for ignition and emergency power uses is the lead-acid battery composed of a plurality of cells, each containing opposed vertical lead and lead dioxide electrode plates immersed in aqueous sulfuric acid electrolyte. The lead-acid battery must be vented since gases develop during charge and discharge. The vent openings permit water to evaporate from the electrolyte. If too much water evaporates, the electrolyte level recedes past the top of the electrode plates and the electrode paste can dry, flake off or become irreversibly affected such as by oxidation of the lead. If too much electrode material flakes off, it can collect at the bottom and form a bridge short-circuiting a cell. A short-circuit of only one cell is sufficient to render the lead-acid battery useless.

Too much water is also undesirable since that can leak acid onto and behind the battery casing and corrode the pan below the battery and the fenderwall next to the battery. It also can cause corrosion of the terminals and cables. Many batteries fail by corrosion and severing of the terminals from the internal connectors to the cell electrodes.

Thus, it is important to maintain a lead-acid storage battery by periodically inspecting the cells and adding the correct amount of water when needed. Inspection of the electrolyte level requires removal of all six caps and peering into the cell. This maintenance service used to be conducted by gas-station attendants or during full-service of an automobile or truck at a dealer. However, marketing of gasoline and mechanic services have changed in the last few years. Most gas stations now offer no-service or full service prices for fuel and there are now specialized services for automobiles such as tune-up, exhaust, brakes, etc. Many automobile owners are opting for the less expensive, no-service gasoline and specialized repair service and are failing to inspect and maintain their batteries.

This problem has been recognized and various devices have been developed to monitor electrolyte level. Krukowski (U.S. Pat. No. 2,886,624) discloses a battery cap-indicator in which brightly colored float 20 is mounted in a clear plug 13. The float remains in the battery when the plug is removed. Ryder, et al. (U.S. Pat. No. 3,383,917) and Melone (U.S. Pat. No. 3,915,753) use a stationery cylindrical indicator rod 20. Light is reflected to the top of the cap when the rod is not immersed in electrolyte. Stazewski (U.S. Pat. No. 4,184,011) discloses a float which projects an indicator rod and button 20 above the cap. Peterson (U.S. Pat. No. 4,308,847) connects a light transmitting rod to a specific gravity detector. Dawkins (U.S. Pat. No. 3,079,887) inserts a small hydrometer into a battery cap and Hruden (U.S. Pat. No. 3,563,806) places a clear window over an absorbent containing PH indicator. Willits (U.S. Pat. No. 2,888,984) uses a check valve to intermittently release gases generated to operate a whistle or gauge to indicate overcharge.

The float devices that indicate electrolyte level are fairly complex and contain a large number of parts which must be separately manufactured and assembled.

STATEMENT OF THE INVENTION

An improved battery cap containing an electrolyte level indicator is provided by the present invention. The cap is compatible with all existing batteries and can be provided as an original equipment cap or can be substituted for the caps of batteries in service. The cap is readily fabricated from very few parts and is inexpensive and reliable. The cap of the invention can contain a vent on its side surface that prevents water and dirt from unintentionally entering a cell.

The battery cap of the invention is formed of two main parts, a hollow body member having a cylindrical cavity and a cylindrical opaque or colored float member, slidingly mounted in the cavity, which rides up and down depending on the electrolyte level. The upper portion of the cap is transparent and the lower section contains threads or a plug-like rim for liquid-tight receipt in the opening in the cell. A vent can be provided on the side wall of the cap in communication with the cell through the cavity. The downward slope prevents ingress of water from hoses or water cans since the vent opening is baffled by the lower face of the opening. Another feature of the battery cap of the invention is the provision of a top collar on the float which engages a stop to prevent the float from falling into the cell and which can close the vent when in its highest position.

These and many other features and attendant advantages of the invention will become apparent as the invention becomes better understood by reference to the following detailed description when considered in conjunction with the accompanying drawings.

DESCRIPTION OF THE INVENTION

Figure 1:
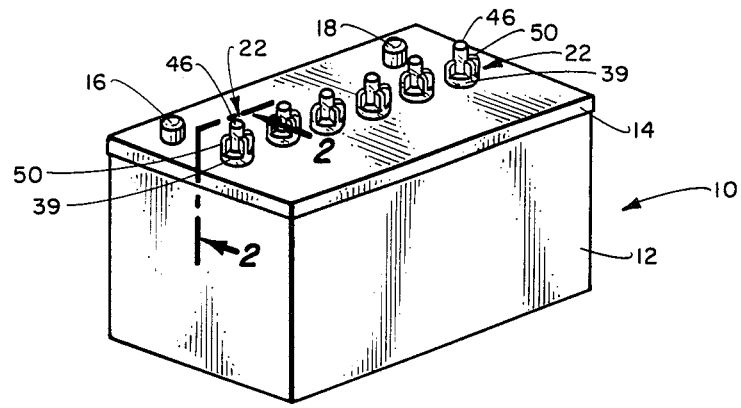
FIG. 1 is a perspective view of a storage battery containing a set of electrolyte-level indicator caps of this invention.
Figure 2:
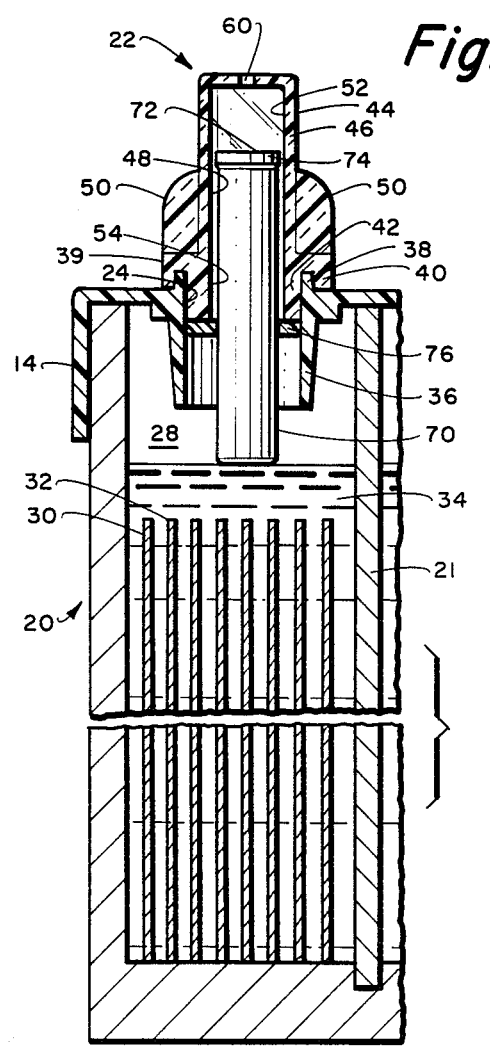
FIG. 2 is a view in section taken along line 2—2 of FIG. 1.

Referring now to FIG. 1, a storage battery 10 is formed of a casing 12 and lid 14. Terminals 16, 18 are provided on the casing or lid 14, as shown. As shown in FIG. 2, the casing is divided into a plurality of cells 20 by means of compartment walls 21. The lid 14 contains an aperture 24 communicating with each cell compartment 28 and receiving the caps 22. A plurality of vertically disposed negative plates 30 and positive plates 32 are received in each cell compartment 28 which are connected by busses and straps, not shown, to terminals 16, 18. The stack of plate electrodes 30, 32 is immersed in liquid electrolyte 34.

Conventional batteries have friction-fit caps or screw-closure caps. In the battery illustrated in FIG. 2, the lid 14 is adapted to accept friction fit cap 22. The lid contains an aperture 24 over each cell. The lid can be formed having an integrally attached, inner, slightly tapering splash-guard 36 and an upwardly facing cylindrical ring 38. The lower section of the cap in turn contains a base 39 from which depends an outer shorter leg 40 and an inner longer leg 42 forming an inverted J-shaped closure engaging the ring 38.

The upper section 44 of the cap 22 contains a hollow, cylindrical, transparent tube 46 forming a cylindrical cavity 48. A plurality of vanes 50 can be attached to the tube 46. The inner wall 52 of the tube has the same diameter as the inner wall 54 of the leg 42. The tube contains at least one vent 60.

A cylindrical float 70 of a vivid or opaque color is positioned in the cavity 48. The length and buoyancy of the float 70 are selected such that the electrolyte level is considered low or unsafe when the top 72 of the float slides at or below the base 39. The length of the tube 46 is chosen so that the electrolyte level is considered adequate or safe when the float 70 is above the vanes 50 up to the top 72 of the float. Visible index marks or numerous other indicia can be used. The top of the float preferably contains a collar 74. An annular disc member 76 having an inner diameter slightly smaller than the diameter of the collar 74 can be attached to the bottom edge of leg 42 to form a stop to prevent the float 70 from falling into the cell 20 when the cap is removed to add water to the cell 20.

Figure 3:
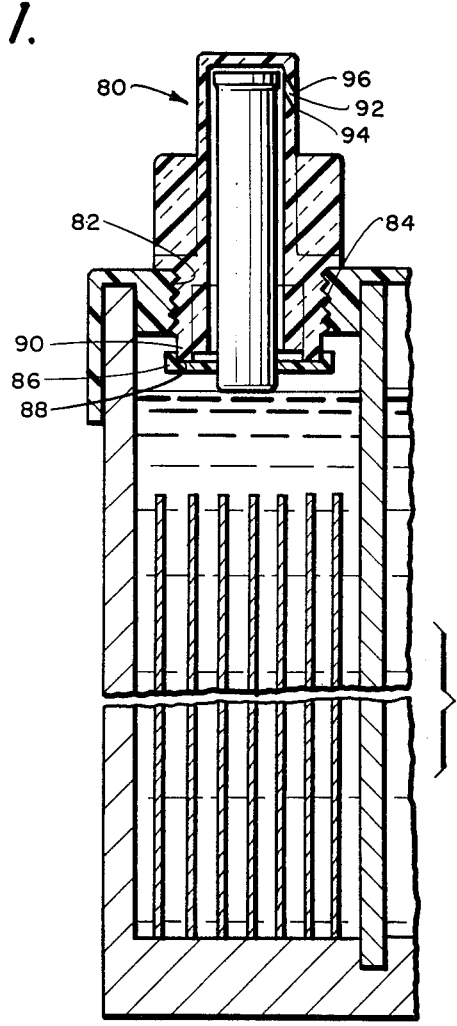
FIG. 3 is a view in section of a further embodiment of a battery cap in accordance with this invention.

Referring now to FIG. 3, a screw fit cap 80 is illustrated. All like parts contain the same part numbers as the battery cell and caps illustrated in FIGS. 1 and 2. The difference is that the lid contains threaded apertures 82 and the caps contain a threaded lower section 84. The float retainer in this embodiment can be a collar 86 attached over the end 88 of the inner extension 90 of gap 80. The vent 92 is provided on the side wall 94 of the tube and is downwardly sloping to prevent ingress of water and accumulated dirt from water cans or hoses. The width of the opening and the angle of the opening are preferably selected such that the lower wall 94 of the opening 92 is above the outer corner 96 of the upper wall.

It is to be realized that only preferred embodiments of the invention have been described and that numerous substitutions, modifications and alterations are permissible without departing from the spirit and scope of the invention as defined in the following claims.

I claim:

1. A battery cap with an electrolyte level indicator comprising in combination:
   a hollow body member having a base for sealingly engaging an opening in the top wall of a cell of a battery, and a long cylindrical hollow tube portion having an upper transparent section with a closed upper end extending above said base and a lower section with an open lower end depending downwardly into the battery cell, both said sections being connected to the base and together forming an elongated, constant diameter, cylindrical hollow cavity;
   a closed, constant diameter cylindrical colored float member having an enlarged top collar mounted in the hollow cavity; and
   a stop member attached to the open lower end of said lower section having an opening smaller than the collar but larger than the diameter of the float for preventing the float from falling through said opening when the cap is removed from the cell.

2. A battery cap according to claim 1 in which the stop member comprises an inverted lid member attached to the end of said lower section and said lid has a cylindrical aperture having a diameter smaller than the collar but larger than the float.

3. A battery cap according to claim 1 in which the body member includes gripping means.

4. A battery cap according to claim 3 in which the gripping means comprises a plurality of vertical vanes attached to the tube portion of the body member.

5. A battery cap according to claim 1 in which the base includes a closure means.

6. A battery cap according to claim 1 in which the opening has screw threads and the closure means comprises a set of mating threads.

7. A battery cap according to claim 1 in which the opening includes a rim and the closure means comprise surfaces for frictionally engaging the rim and the opening.

8. A battery cap according to claim 1 in which the upper tube portion further includes a vent.

9. A battery cap according to claim 8 in which the vent is positioned on top of the tube portion.

10. A battery cap according to claim 8 in which the vent is positioned on the side of the tube portion.

11. A battery cap according to claim 10 in which the walls of the vent are downwardly facing.

12. A battery cap according to claim 11 in which the vent is positioned on the side of the tube portion near the top of the tube portion.

13. A battery cap according to claim 2 in which the top lid member has a lip engaging the outer surface of the end of the lower section.

* * * * *